April 23, 1957     E. E. W. MARTINSON     2,789,767

PLURAL ZONE TEMPERATURE CONTROL APPARATUS

Filed Nov. 3, 1954     2 Sheets-Sheet 1

INVENTOR
EDWARD E. W. MARTINSON

BY Joseph E. Ryan

ATTORNEY

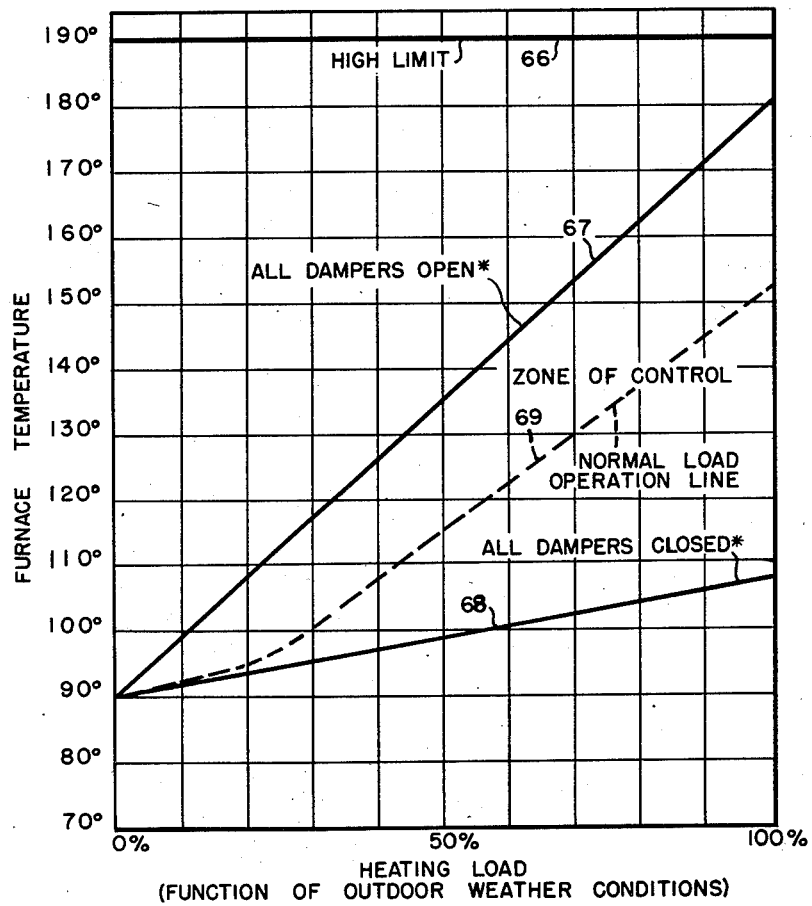

United States Patent Office 2,789,767
Patented Apr. 23, 1957

2,789,767

PLURAL ZONE TEMPERATURE CONTROL APPARATUS

Edward E. W. Martinson, Moundsview Township, Ramsey County, Minn., assignor to Minneapolis-Honeywell Regulator Company, Minneapolis, Minn., a corporation of Delaware Application November 3, 1954, Serial No. 466,580

8 Claims. (Cl. 236—9)

This invention relates to a temperature control system for a plurality of zones, in particular, in a heating installation having a furnace for delivering a quantity of heated medium to each zone in which the temperature of the furnace is controlled proportionally in response to the outdoor temperature, the total quantity of heating medium delivered to all zones, and the total operating time of the heat source or burner.

It is often desirable to separate different areas of a home or dwelling into zones and provide for the temperature control of each zone independent of the other zones, this is usually done by complicated and expensive heating control systems. There has been a great need for an inexpensive and simple control system for controlling multizone heating installations in small dwellings. In the copending application of Hubert T. Sparrow, Serial No. 414,659, filed March 8, 1954, a control apparatus is shown for controlling the temperature of a furnace used in a multizone system. A damper motor in each zone controls the amount of heated air, in the particular case, to the zone, the motor also operating a variable resistor. The heat source or burner of the furnace is connected to a source of power through a switch that is actuated by a liquid filled bellows having two remotely located bulbs, one being placed in the furnace to respond to furnace temperature. A heat associated with one of the bulbs is connected to a source of power through a series connection including the variable resistor of each zone to affect the liquid filled system so that the furnace temperature, as sensed by the first bulb placed in the furnace, is modified depending upon the position of the damper motors or the total quantity of air delivered to all zones.

The present invention is an improvement and provides for a more even control of the temperature in each zone as it prevents the unstable operation of the previous system. In particular, the plenum or furnace temperature is reset by the outdoor temperature and the action of the outdoor bulb is modified by the heater action in accordance with load demand of the zones as the resistance in the heater circuit is changed by the damper actuators, similar to the Sparrow system; however, the heater circuit contains a switch operated with the burner control circuit so that the heater is only energized when the burner is operated. This provides for a further reset on the furnace temperature depending on heating load or the total operating period of the furnace.

It is therefore an object of the present invention to provide an improved temperature control system for a multizone installation.

It is another object of the present invention to provide an improved inexpensive temperature control system in which the temperature of the temperature changing device is controlled in response to the outdoor temperature, the total quantity of heated medium exhausted from the temperature changing device, and the length of time the burner or heat source is energized.

Another object of the present invention is to provide an inexpensive and simple control system for a multi-zone installation wherein the operating temperature of the heat furnishing means is proportional to the combined effects of the outdoor temperature, the total quantity of heated medium delivered from the heat furnishing means, and the period of operation of the heat source.

For a more thorough understanding of the invention, reference is made to the following specification and the accompanying drawings in which:

Figure 2 is a graphical representation of a particular operating schedule of the maintained furnace temperature for various values of the damper positions and the total heating load.

Figure 1:
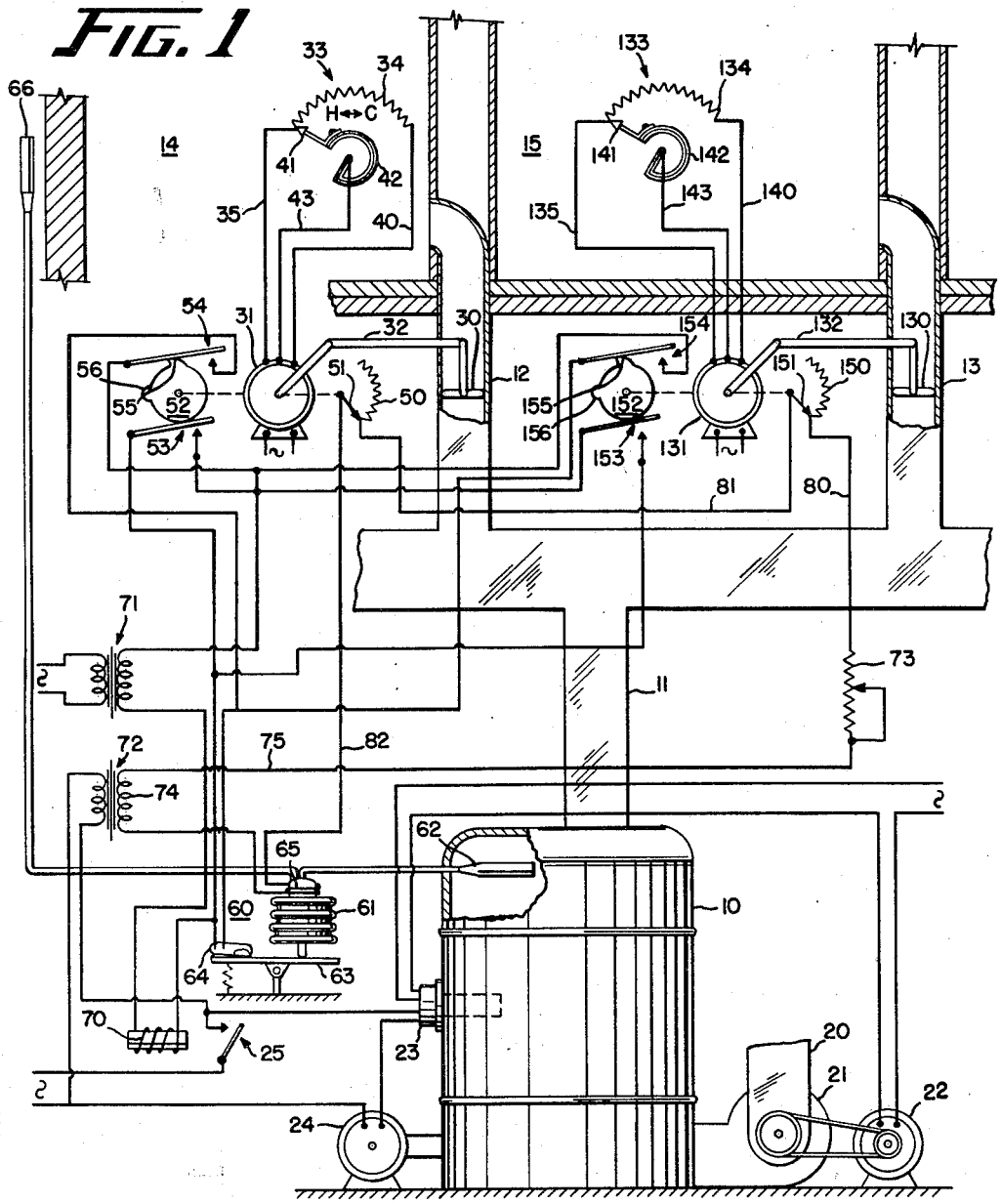
Figure 1 is a schematic showing of the multizone heating installation in which a furnace delivers a quantity of heated air to individual zones depending upon the position of dampers in the particular conduit, the furnace temperature being controlled by a switch responsive to outdoor temperature, air demand to the zones, and heating load.

Referring to Figure 1, a furnace 10 of the hot air type is connected through a duct 11 to deliver heated air to a multizone dwelling. Feeder ducts 12 and 13 connected to duct 11 deliver air to the rooms or zones 14 and 15, respectively. Air returns from these zones by a return air duct 20 connected to fan 21. Fan motor 22 is connected to a source of power through a combination switch 23 of a conventional type so that whenever the bonnet or plenum temperature of the furnace is above a predetermined value the fan motor will be energized to begin circulation of air from the zones through the return duct and the furnace up to the zones again. A burner 24 of a suitable type furnishes heat to the furnace, it being controlled through a series circuit comprising a relay 25 and combination switch 23. Switch 23, as it applies to the burner, prevents an excessive temperature from developing inside the furnace.

As each of the zones 14 and 15 contains similar control apparatus, the apparatus of zone 14 will be explained in detail with the numbers and similar apparatus of zone 15 will be numbered by adding 100 to the number used for zone 14. The flow of heat from the furnace to zone 14 is controlled by a damper 30 in duct 12, it being connected to a damper motor 31 by a suitable linkage 32. Motor 31 is connected to a thermostat located in the zone in a manner that it adequately responds to the average temperature of the zone. The thermostat comprises a resistor 34 having end terminals connected by conductors 35 and 40 to motor 31. Cooperating with the resistor 34 is a wiper 41 positioned by a bimetallic element 42 responsive to the zone temperature to provide a third electrical connection through conductor 43 to the motor. The thermostat and motor combination is of the sort similar to that disclosed in the Daniel G. Taylor Patent 2,028,110, issued January 14, 1936, in which the position of the output arm of the motor and thus the damper 30 is determined by the position of wiper 41 with respect to resistor 34. As shown the zone temperature is satisfied and wiper 41 is to be left extreme position on resistor 34 which causes motor 31 to move to its extremity in a position to close damper 30. As the wiper 41, in response to the zone temperature as sensed by element 42, moves to the right across resistor 34 a respective position of the damper is obtained. When the wiper 41 is at the far right extremity of resistor 34, damper 30 is vertical or wide open.

Associated with motor 31 is a potentiometer having a resistor 50 and a wiper 51 which is positioned by motor 31 as it operates damper 30. As shown with the damper closed the potentiometer wiper 50 is in a position so that a minimum resistance exists between the output terminals and as the motor opens damper 30 the wiper 51 moves upward on resistor 50. A cam 52 connected to motor 31 operates the pair of switches 53 and 54 depending upon the position of damper 30. When the damper is closed both switches are open; however, as soon as the damper begins to open a high point 55 on cam 52 moves to allow switch 54 to close. When damper 30 is fully open the high point of the cam closes switch 53.

A switch operator 60 has a liquid filled bellows 61 having a pair of bulbs 62 and 66 connected thereto, bulb 62 being responsive to the plenum or bonnet temperature of furnace 10 and bulb 66 being responsive to outdoor temperature. As shown the temperature of the furnace is at the selected value and the pressure inside bellows 61 is sufficient to teeter a pivoted bar 63 clockwise in a direction to open a switch 64. Switch 64 is a conventional switch of mercury switch type. An operating coil 70 of relay 25 is connected to the secondary of a transformer 71 through a circuit comprising switch 64 and switches 54 and 154 connected in parallel. As the furnace temperature decreases below the desired value and lever 63 teeters counterclockwise as bellows 61 contracts and switch 64 is closed; however, as neither zone 14 nor zone 15 is calling for heat switches 54 and 154 are open and the relay 25 will remain unenergized. Upon a need for heat in any one of the zones the damper motor will operate to open the damper and either switch 54 or 154, or both, will close to then energize coil 70 to initiate operation of burner 24. The heat level or temperature of the furnace is then maintained at the predetermined value depending upon the calibration of operator 60 by starting and stopping burner 24 through switch 64.

The reset temperature calibration of operator 60 is modified by the application of heat to bellows 61 by an electrical heater 65 to establish the heat level of the furnace. The heater is connected to a source of power 72 through a series circuit comprising the zone potentiometers and a calibration resistor 73 as traced by the circuit from secondary winding 74, conductor 75, resistor 73, conductor 80, the lower end of resistor 150, wiper 151, conductor 81, the lower end of resistor 50, wiper 51, conductor 82, heater 65, and again secondary 74. As shown with the dampers closed the initial resistance in the circuit is adjusted by resistor 73 so that as the zones call for heat and the switches 54 and 154 close the temperature of the furnace is scheduled in proportion to the outdoor temperature, the position of the zone dampers, or the total quantity of heated air that is delivered to all of the zones. This is done by the addition of resistance in the circuit of heater 65 as wipers 51 and 151 move upward on their respective resistors whenever the zone dampers open. Such an arrangement is similar to the invention of the aforementioned Sparrow application; however, source of power 72 is connected to the main power source through relay 25 so that power is only available at secondary 74 when the relay coil 70 is energized and the burner is placed in operation. This is an improvement over the invention of the Sparrow application as it provides for more stability in the control of the zone temperatures.

Referring to Figure 2, a graphical representation of furnace temperature versus the heating load which is a function of the outdoor weather conditions is shown for an installation of this type. While the temperature values for particular load percentages are shown it of course is realized that these are only arbitrary values of one particular installation for explanation purposes. It is possible that any furnace temperature might be obtained for one particular heating load depending upon the design of the installation apparatus and the furnace. With all of the dampers open neglecting the operation of the switches associated with cams 52 and 152 a maximum amount of resistance is placed in the circuit containing heater 65 so that the heat applied to bellows 61 and thus the depression of the furnace temperature is a minimum. The furnace temperature under these conditions for different values of load is shown represented by the line 67 labeled "All Dampers Open." This line is adjusted by calibration resistor 73.

With all of the zones satisfied and the zone dampers closed a minimum amount of resistance is placed in the heater circuit by the zone damper potentiometers so that a maximum amount of temperature depression is obtained. This is shown graphically by a line 68 labeled "All Dampers Closed." As the dampers open a proportional amount of resistance is placed in the heater circuit and the operation is controlled between the two lines 67 and 68 shown on the graph depending upon the total amount of heated air delivered to the zones; that is, the net effect of the damper position, and the percentage of total operation time of the burner.

Switches 53 and 153 are closed when either damper 30 or 130, respectively, is wide open to shunt switch 64 to provide a maximum output of furnace 10 whenever any one of the zones needs a maximum delivery of heat thereto. Relay winding 70 is then connected directly across secondary 71 and burner 24 operates off of high limit switch 23 to maintain a maximum plenum temperature as indicated by a line 66 and thus a maximum heat output to the zones. As soon as the particular damper which was wide open closes slightly either switch 53 or 153 would open and, again the temperature of the furnace is maintained by operator 60 according to a schedule depending upon the combined damper positions and the operating time of burner 24.

The circuit containing relay 70 is connected so that upon a failure of switch 64 in a closed contact manner, the system will safely operate by cycling as an on-off control using switches 54 and 154. This prevents extreme overheating as would be the case with controller 23. The failure of switch 64 would be soon detected by the abnormal variation in room temperature. Of course, controller 23 is the high limit should it be needed.

*Operation*

As shown in Figure 1 both of the zones 14 and 15 are satisfied and zone dampers are closed. The high portion 55 and 155 on the cams associated with the zone dampers have opened switches 54 and 154 to deenergize relay 25 thus shutting down the burner 24. Upon a call for heat in one of the zones, for example zone 14, wiper 41 would move to the right across resistor 34 in response to the action of the bimetal 42 which responds to zone temperature. Motor 31 would open damper 30 and at the same time rotate cam 52 clockwise to close switch 54. As the plenum temperature in furnace 10 as sensed by bulb 62 is obviously lower than required, operator 60 would already have tilted lever 63 to close switch 64, thus winding 70 of the burner relay would be connected to source of power 71.

Upon the initiation of burner operation switch 25 also connects transformer 72 to a power source so that heater 65 is now energized and the resistance in the heater circuit is near a minimum as wiper 51 has only moved slightly upward on resistor 50. The action of heater 65 depresses the plenum temperature maintained in the furnace. As the outdoor bulb 66 resets the furnace temperature, the action of the heater is best described as reset on reset as it effects the temperature of the furnace. Referring to Figure 2, the amount of temperature depression would be indicated by the line 68 or slightly thereabove, depending on the amount the damper is opened. Line 67 represents the normal reset line established by outdoor bulb 66 with relatively no heat from heater 65. The greater the heating load, which is a function of the outdoor weather conditions such as outdoor temperature, wind and the effect of no sun radiation, the more heater 65 is connected to its source of power thus the more the furnace temperature is reset to a lower value. For example under steady state conditions, at a 50% heating load the plenum temperature of the furnace with the damper slightly open for zone 14 is approximately 115 degrees; however, with a heating load of 100% the plenum temperature is increased to 153 degrees.

This is an improvement over the invention of the aforementioned Hubert T. Sparrow application in which it was found that the zone temperature control was quite unstable in the heating load range below 50%. By connecting the heater 65 so that it only operates whenever the burner is energized a cyclic hunt previously experienced does not occur and better control is obtained in all load conditions.

As damper 30 opens, the resistance in the heater circuit increases so that the furnace temperature at any particular heating load increases. Should a maximum amount of heat be needed to the zone and the damper is wide open, such being the case during morning pickup, the high portion 55 of the cam closes switch 53 to shunt switch 64 and place the burner under the control of the high limit switch 23. This provides a maximum furnace output as indicated in Figure 2 by line 66. As soon as the damper 30 closed slightly and switched 53 open, the furnace temperature would again be depressed to some value, depending on the heating load and the outdoor temperature, in the area between the lines 67 and 68 labeled "Zone of Control." Of course a similar result would take place for zone 15 operating alone. For the average installation it has been found that a steady state or "normal load operation line" 69 laying between lines 67 and 68 will be followed. That is the maintained furnace temperature will be scheduled along line 69 depending on the heating load. Any unusual change in heat requirements of course changes the operating temperature of the furnace to a value within the "zone of control."

When both zones call for heat and the dampers open the resistance in the heater circuit would increase even more however the furnace temperature is scheduled by outdoor temperature along line 67 unless one of the switches 53 or 153 is closed. Thus it is seen, as the demand of heat increases to the zones the furnace temperature is increased and neglecting the operation of the switches 54, 154, 53, and 153 the furnace temperature would be maintained at some value which could be indicated by a point in the "Zone of Control." The position of this operating point would be a function of the total amount of heat demanded by the zones and the heating load of the building containing the zones, as well as the direct effect of the outdoor temperature on bulb 66.

While certain temperatures are shown in Figure 2, it should be understood that the position of line 67 as well as line 68 would depend on the various values of the components in the heater circuit and the calibration resistance 73 and could be set for any particular installation.

While this invention is disclosed as it applies to a heating installation of a forced air type it is obvious that any sort of conditioning installation might be used; however, the invention should be limited only by the scope of the appended claims.

I claim:

1. In temperature control apparatus for controlling the temperature of a multizone dwelling; temperature changing means for changing the temperature of a medium; conduit means connecting said temperature changing means to each of said zones for delivering a quantity of temperature conditioned medium to said zones; flow control means associated with each of said conduit means for controlling the quantity of conditioned medium delivered to each of said zones; variable resistance means associated with each of said flow control means having a maximum resistance when said flow control means is wide open; switch means having a bellows type operator connected in a closed fluid system with a plurality of remotely located bulbs so that upon expansion of said fluid a predetermined amount upon an increase in the temperature of said bulbs said switch means will open, one of said bulbs being responsive to the temperature of the medium in said temperature changing means, another being responsive to outdoor temperature; means including said switch means for selectively energizing said temperature changing means to maintain a predetermined temperature of said medium therein; an electric heater associated with said bellows for heating the fluid therein; means including each of said variable resistance means and said switch means connected in series for connecting said heater to a source of power thereby the temperature of the medium in said temperature changing means depends upon the total quantity of conditioned medium being delivered to all of said zones and the length of operation of said temperature changing means; means associated with each of said flow control means for providing continuous operation of said condition changing means whenever any one of said flow control means is wide open; and further means associated with each of said flow control means for deenergizing said temperature changing means when all of said flow control means are closed.

2. In temperature control apparatus; temperature changing means for supplying a quantity of air to a plurality of spaces; a plurality of conduit means connecting said temperature changing means and each of said spaces; temperature responsive means in each of said spaces; flow control means in each of said conduit means; motor means for driving each of said flow control means, said motor means being controlled by its respective temperature responsive means so that the amount of air flow to each zone is regulated to maintain a selected space temperature; pressure responsive means having a plurality of bulbs connected thereto in a closed liquid filled system, the temperature of the liquid determining the pressure therein, one of said bulbs being responsive to the air temperature in said temperature changing means, a second of said bulbs being responsive to outdoor temperature; switch means actuated by said pressure responsive means for controlling said temperature changing means; a source of power, electrical heater means for heating said pressure responsive means and thus the liquid therein; variable resistance means associated with each of said motor means, said resistance means having a maximum resistance when the air flow through its respective conduit means is a maximum; and means including said switch means and all of said variable resistance means for connecting said heater means to said source of power whereby the effectiveness of said heater means depends on the length of operation of said temperature changing means and the total quantity of air delivered to said spaces.

3. In a temperature control system; temperature changing means for a plurality of spaces; connection means connecting said changing means and said spaces so that a heated medium is directed from said changing means to each of said spaces to maintain the temperature of each space at a predetermined value; flow control means for controlling the quantity of said medium to each space; temperature responsive control means responsive to the temperature of each space for controlling its respective flow control means; a temperature control device comprising a switch and means responsive to the temperature of said medium in said temperature changing means for controlling said switch, said device being adapted to control the heat output of said temperature changing means; a plurality of variable resistance means each operated by a flow control means and having a resistance proportional to air flow to its particular space; and means, including said switch means and each of said resistance means connected in series, associated with said device for changing the temperature of said temperature changing means depending upon the time of operation of said temperature changing means and the total quantity of said medium that is delivered to said spaces.

4. In a temperature control apparatus; temperature changing means for supplying a quantity of temperature conditioned medium to a space, flow control means for controlling the quantity of medium to each of said spaces; temperature responsive means responsive to space temperature for controlling its respective flow control means; temperature control means for controlling the energization thereof and thus temperature of said medium leaving said temperature changing means, said control means having second temperature responsive means responsive to the temperature of the medium in said temperature changing means; means for biasing said second temperature responsive means to lower the temperature of said medium leaving said temperature changing means; and means including said flow control means and said temperature control means for regulating the operation of said biasing means in response to the total quantity of said medium delivered to said space and the length of energization periods of said temperature changing means.

5. In control apparatus for controlling the temperature of a plurality of spaces, temperature changing means, conduit means for connecting said temperature changing means to each of said spaces, flow control means associated with each of said conduit means for controlling the quantity of heated medium that is delivered from said temperature changing means to each of said spaces, switch means responsive to the temperature of the medium in said changing means for scheduling the output of said temperature changing means by controlling its energization, and means associated with each of said flow control means and said switch means for modifying the operation of said switch means so that its output depends upon the total quantity of heated medium being delivered to all spaces and the length of the periods of energization of said temperature changing means.

6. In control apparatus, temperature changing means, conduit means for connecting said temperature changing means to a plurality of zones, flow control means associated with each of said zones for controlling the quantity of medium from said temperature changing means to each of said zones, temperature responsive switch means for controlling the operation of said temperature changing means, said switch means responding to the temperature of the medium in said changing means, and means including each of said flow control means and said switch means for modifying the operation of said switch means so that the temperature of said medium leaving said changing means varies with quantity of medium delivered to all zones and the length of the operating periods of said temperature changing means.

7. In temperature control apparatus for controlling the temperature in a plurality of zones, heat furnishing means, conduit means connecting each of said zones to said heat furnishing means, flow control means for each zone for controlling the quantity of heated medium to each zone from said temperature changing means, means responsive to the total quantity of medium delivered to said zones, means responsive to the total time of operation of said heat furnishing means, and means connecting said last two mentioned means in a manner to control the temperature of said heat furnishing means.

8. In control apparatus, condition changing means, conduit means for supplying medium to a plurality of spaces from said condition changing means, first control means associated with each space for controlling the quantity of said medium delivered thereto, second control means for controlling the operation of said condition changing means to maintain the condition of said medium at a predetermined level, means including each of said first control means and said second control means for modifying the operation of said second control means so that the operation of said condition changing means will depend upon the total quantity of said medium supplied to said spaces and the length of time of operation of said condition changing means.

References Cited in the file of this patent

UNITED STATES PATENTS

| | | |
|---|---|---|
| 2,188,775 | Locke | Jan. 30, 1940 |
| 2,189,381 | McGrath | Feb. 6, 1940 |
| 2,584,445 | Hajek | Feb. 5, 1952 |